(12) United States Patent
Choi (10) Patent No.: US 10,249,860 B2
(45) Date of Patent: Apr. 2, 2019

(54) CARTRIDGE FRAME HAVING DOUBLE SIDEWALL STRUCTURE AND BATTERY MODULE HAVING THE SAME

(71) Applicant: LG Chem, Ltd., Seoul (KR)

(72) Inventor: Seung-Ryul Choi, Daejeon (KR)

(73) Assignee: LG Chem, Ltd. (KR)

( * ) Notice: Subject to any disclaimer, the term of this patent is extended or adjusted under 35 U.S.C. 154(b) by 72 days.

(21) Appl. No.: 15/508,389

(22) PCT Filed: Aug. 12, 2015

(86) PCT No.: PCT/KR2015/008464
§ 371 (c)(1),
(2) Date: Mar. 2, 2017

(87) PCT Pub. No.: WO2016/072594
PCT Pub. Date: May 12, 2016

(65) Prior Publication Data
US 2017/0294634 A1    Oct. 12, 2017

(30) Foreign Application Priority Data

Nov. 5, 2014  (KR) .................. 10-2014-0153179
Aug. 11, 2015  (KR) .................. 10-2015-0113378

(51) Int. Cl.
*H01M 2/10*          (2006.01)
*H01M 10/6555*    (2014.01)
(Continued)

(52) U.S. Cl.
CPC ....... *H01M 2/1094* (2013.01); *H01M 2/0212* (2013.01); *H01M 2/0287* (2013.01);
(Continued)

(58) Field of Classification Search
None
See application file for complete search history.

(56) References Cited

U.S. PATENT DOCUMENTS 7,858,229 B2   12/2010  Shin et al.
9,023,503 B2    5/2015  Seong et al.
(Continued)

FOREIGN PATENT DOCUMENTS

CN    103563124 A    2/2014
EP      1717882 A1   11/2006
(Continued)

OTHER PUBLICATIONS

Supplementary European Search Report for Application No. EP15857203 dated Dec. 20, 2017.
(Continued)

*Primary Examiner* — Scott J. Chmielecki
(74) *Attorney, Agent, or Firm* — Lerner, David, Littenberg, Krumholz & Mentlik, LLP

(57) ABSTRACT

Provided is a cartridge frame which is inserted between a plurality of unit battery cells stacked in the fabrication of a modularized battery and a battery module having the same. The cartridge frame according to one aspect of the present disclosure includes an inter-cell separation plate with a planar shape inserted between adjacent unit battery cells to separate the adjacent unit battery cells, and a sidewall part extending in a direction perpendicular to the planar surface of the inter-cell separation plate at an edge other than an edge of a direction in which an electrode terminal of the battery cell is drawn, among edges of the inter-cell separation plate, wherein for at least a portion of the sidewall part, an inner sidewall coming into contact with a side surface of the unit battery cell is made from metal, and an outer sidewall facing the inner sidewall is made from plastic.

11 Claims, 5 Drawing Sheets

(a)

(b)

US 10,249,860 B2

Page 2

(51) Int. Cl.
*H01M 2/02* (2006.01)
*H01M 10/04* (2006.01)

(52) U.S. Cl.
CPC ........... *H01M 2/10* (2013.01); *H01M 2/1016* (2013.01); *H01M 2/1061* (2013.01); *H01M 2/1072* (2013.01); *H01M 2/1077* (2013.01); *H01M 10/0463* (2013.01); *H01M 10/6555* (2015.04)

(56) References Cited

U.S. PATENT DOCUMENTS

| | | | |
|---|---|---|---|
| 10,026,937 B2 * | 7/2018 | Kim | H01M 2/1061 |
| 2006/0266542 A1 | 11/2006 | Yoon | |
| 2011/0143179 A1 | 6/2011 | Nakamori | |
| 2012/0288740 A1 * | 11/2012 | Byun | H01M 2/021 |
| | | | 429/96 |
| 2013/0131258 A1 | 5/2013 | Kwon et al. | |
| 2014/0011058 A1 * | 1/2014 | Adachi | H01M 10/425 |
| | | | 429/61 |
| 2014/0045037 A1 | 2/2014 | Nishikawa et al. | |
| 2014/0050966 A1 | 2/2014 | Merriman et al. | |
| 2014/0099527 A1 | 4/2014 | Seong et al. | |
| 2015/0064514 A1 * | 3/2015 | Wu | H01M 10/658 |
| | | | 429/56 |
| 2015/0303415 A1 * | 10/2015 | Kayano | H01M 2/206 |
| | | | 429/159 |
| 2016/0248061 A1 * | 8/2016 | Brambrink | C08L 69/00 |
| 2016/0248135 A1 * | 8/2016 | Kim | H01M 10/625 |
| 2016/0254504 A1 * | 9/2016 | Kim | H01M 2/1061 |
| | | | 429/99 |
| 2017/0214018 A1 * | 7/2017 | Sun | B60K 1/04 |

FOREIGN PATENT DOCUMENTS

| | | |
|---|---|---|
| JP | 2002124233 A | 4/2002 |
| JP | 2006185756 A | 7/2006 |
| JP | 2008004506 A | 1/2008 |
| JP | 2010097865 A | 4/2010 |
| JP | 4745880 B2 | 8/2011 |
| JP | 2013004835 A | 1/2013 |
| KR | 10-0921346 B1 | 10/2009 |
| KR | 20110066088 A | 6/2011 |
| KR | 101307992 B1 | 9/2013 |
| KR | 20130125341 A | 11/2013 |
| WO | 2012015128 A1 | 2/2012 |
| WO | 2014027853 A1 | 2/2014 |

OTHER PUBLICATIONS

International Search Report from PCT/KR2015/008464, dated Oct. 23, 2015.

* cited by examiner

CARTRIDGE FRAME HAVING DOUBLE SIDEWALL STRUCTURE AND BATTERY MODULE HAVING THE SAME

CROSS-REFERENCE TO RELATED APPLICATIONS

The present application is a national phase entry under 35 U.S.C. § 371 of International Application No. PCT/KR2015/008464 filed Aug. 12, 2015, which claims priority to Korean Patent Application No. 10-2014-0153179 filed on Nov. 5, 2014 in the Republic of Korea and Korean Patent Application No. 10-2015-0113378 filed on Aug. 11, 2015 in the Republic of Korea, the disclosures of which are incorporated herein by reference.

TECHNICAL FIELD

The present disclosure relates to a battery module having a stack of unit battery cells, and more particularly, to a structure of a cartridge frame inserted between unit battery cells in a battery module.

BACKGROUND ART

As opposed to a disposable primary battery, a secondary battery can be recharged repeatedly, and is being used not only in the field of high-tech compact electronic devices, such as, including mobile phones, personal digital assistants (PDAs), and laptop computers, but also as a source of power of energy storage systems and electric vehicles or hybrid vehicles.

For a device requiring high power such as a motor drive system in electric vehicles or hybrid vehicles or power storage systems, it is general to use a high capacity modularized battery in which a plurality of unit battery cells is stacked and connected in series or parallel.

On the other hand, a secondary battery generates a large quantity of heat during charge and discharge, and unless the heat is efficiently cooled, the service life of the secondary battery is shortened and a malfunction occurs, resulting in stability degradation, and in worse cases, leading to a fire and an explosion, so efficient cooling is an important task in the fabrication of a modularized battery including a secondary battery.

Also, for electric vehicles or hybrid vehicles, in the event that battery cells are subject to serious impacts or physical damage by a traffic accident, for example, a battery cell is damaged when pierced by a pointed object, an internal short occurs, leading to a fire or an explosion, and a driver or a passenger may be confronted by a dangerous situation.

On the other hand, a unit battery cell may be a can-type battery embedded in a prismatic or cylindrical case made of metal, or a pouch-type battery in which an electrode assembly and an electrolyte are embedded in a pouch packaging made of a sheet having a synthetic resin coating layer laminated on a main material, such as, for example, an aluminum foil.

A can-type battery has a higher physical strength than a pouch-type battery, while a pouch-type battery which is more lightweight and easier to fabricate is being widely used in recent days. However, a pouch-type battery has a disadvantage of poor resistance to expansion and an explosion resulting from an external impact or an internal short, that is, a low mechanical strength.

For these reasons, a modularized battery, in particular, a modularized battery using a pouch-type battery as a unit battery cell, employs a method which inserts and stacks a cartridge frame with a structure easy to receive and stack unit battery cells between the stacked unit battery cells as in Korean Patent No. 10-1307992 or Korean Patent No. 10-0921346.

Figure 1:
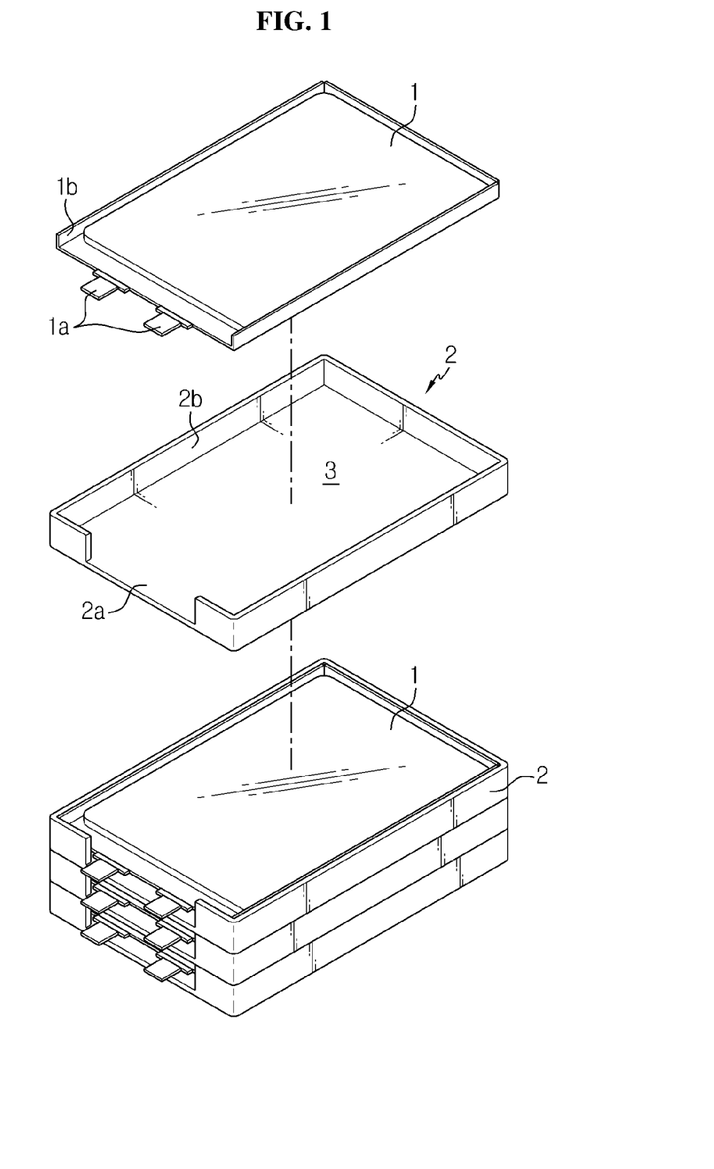
FIG. 1 is a schematic perspective view showing an ordinary cartridge frame and a structure in which a plurality of unit battery cells is stacked using the same.

FIG. 1 is a schematic perspective view showing an ordinary cartridge frame and a structure in which a plurality of unit battery cells is stacked using the same.

Referring to FIG. 1, an ordinary cartridge frame 2 has a structure which has an inter-cell separation plate 2a and a sidewall 2b so that a cell receiving part 3 which fits to a shape and a size of a unit battery cell 1 is formed.

The inter-cell separation plate 2a is generally made of metal having high thermal conductivity, such as, for example, aluminum, and absorbs heat generated from the battery cell 1 to cool the battery cell 1, and according to circumstances, the inter-cell separation plate 2a may have a refrigerant channel along the edges thereof, through which a cooling fluid flows, or a hole through which air passes.

On the other hand, the sidewall 2b is generally made of plastic, and it is not only because plastic is a material that is easy to manipulate by injection molding, but also because insulation should be ensured due to a risk of a contact between the sidewall 2b and an electrode terminal 1a of the battery cell in the manufacture and maintenance and repair of the battery module.

However, if the sidewall 2b of the cartridge frame 2 is formed of plastic, in the event of a fire or combustion of the battery cell 1, the sidewall 2b is prone to melt or combustion, causing a fire or combustion in other adjacent battery cell 1. This problem may be more serious in the case where a pouch-type battery is used as the unit battery cell 1. That is, in the pouch-type battery, a heat-sealing part 1b of a laminate sheet formed on the side surface of the battery cell 1 is structurally the most weak portion. Thus, when the battery cell 1 expands due to abnormal heat generation or internal gas in the battery cell 1, the side surface of the battery cell 1 is susceptible to burst. In this case, the sidewall 2b of the cartridge frame 2 made of a plastic material coming into contact with the side surface of the battery cell 1 is likely to melt or combustion by high temperature gas or flames emitting from the burst part.

DISCLOSURE

Technical Problem

In the context of the above-described related art, the present disclosure is directed to providing a cartridge frame with a structure that is less prone to melt or combustion in the event of a fire or combustion in any one unit battery cell, thereby preventing the propagation of the fire or combustion to other adjacent battery cell, and a battery module having the same.

Technical Solution

To achieve the above object, a cartridge frame according to one aspect of the present disclosure is a cartridge frame which is inserted between a plurality of unit battery cells stacked, and includes an inter-cell separation plate with a planar shape inserted between adjacent unit battery cells to separate the adjacent unit battery cells, and a sidewall part extending in a direction perpendicular to the planar surface of the inter-cell separation plate at an edge other than an edge of a direction in which an electrode terminal of the battery cell is drawn, among edges of the inter-cell separation plate, wherein for at least a portion of the sidewall part, an inner sidewall coming into contact with a side surface of the unit battery cell is made from metal, and an outer sidewall facing the inner sidewall is made from plastic.

Preferably, the inter-cell separation plate may be formed from metal.

Preferably, the metal used to make the inner sidewall and/or the inter-cell separation plate may be aluminum or an aluminum alloy.

According to one aspect, the cartridge frame may have the inter-cell separation plate and the sidewall part integrally formed by insert injection molding.

According to another aspect, the cartridge frame may further include an electrode terminal connection part coupled to the edge of the direction in which the electrode terminal of the battery cell is drawn, among the edges of the inter-cell separation plate, such that the electrode terminal is connected to the electrode terminal connection part.

According to still another aspect, a flame barrier layer may be interposed between the inner sidewall and the outer sidewall. The flame barrier layer may be formed from a resin composition with flame retardancy and heat resistance, or a ceramic material with heat resistance. In one example, the resin composition may be foam-processed.

According to further another aspect, the sidewall part may protrusively extend to a height corresponding to a thickness of the unit battery cell from the inter-cell separation plate.

To achieve the object, a battery module according to another aspect of the present disclosure includes a plurality of the above-described cartridge frames, and is made by inserting at least one unit battery cell between the plurality of cartridge frames and stacking thereof.

Preferably, the unit battery cell may be a pouch-type battery cell.

Advantageous Effects

According to the present disclosure, as the inner sidewall of the sidewall part of the cartridge frame coming into contact with the side surface of the unit battery cell is made from metal, when the unit battery cell is subject to a fire or combustion, the inner sidewall made from metal absorbs heat or blocks flames and radiates the heat, thereby preventing the sidewall part of the cartridge frame from easily melting or combusting.

Thus, in case a plurality of unit battery cells is stacked using the cartridge frame to form a battery module, albeit any one unit battery cell is subject to a fire or combustion, the propagation of the fire or combustion to other adjacent battery cell may be prevented.

Also, when a flame barrier layer is interposed between the inner sidewall and the outer sidewall of the sidewall part of the cartridge frame, the propagation of a fire or combustion between unit battery cells may be prevented more effectively.

The present disclosure is useful especially in the case the unit battery cells of the battery module are a pouch-type battery cell.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

MODE FOR CARRYING OUT THE INVENTION

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Also, the configurations illustrated in the drawings and the embodiments are just preferable examples for the purpose of illustrations only, not intended to limit the scope of the disclosure, so it should be understood that other equivalents and modifications could be made thereto without departing from the scope of the disclosure.

Figure 2:
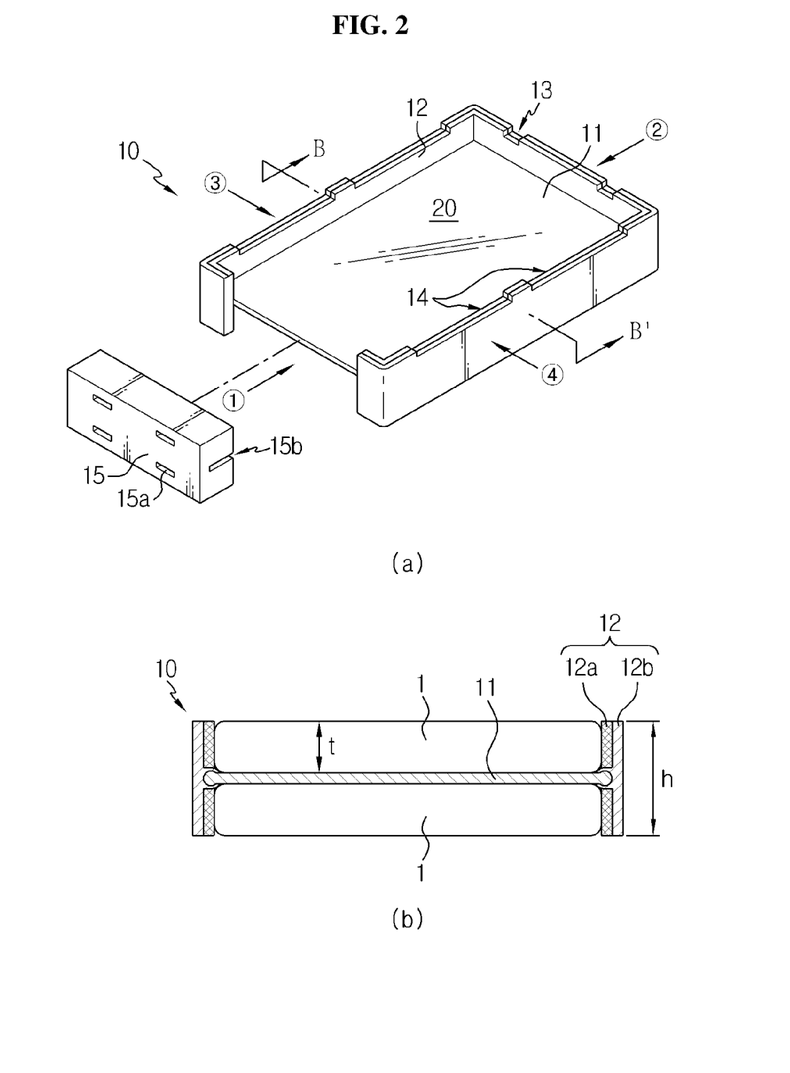
FIG. 2 shows a schematic partially exploded perspective view (a) and a cross-sectional view (b) taken along the line of B-B, depicting a cartridge frame of an embodiment according to one aspect of the present disclosure.

FIG. 2 shows a schematic partially exploded perspective view (a) and a cross-sectional view (b), depicting a cartridge frame of an embodiment according to one aspect of the present disclosure.

Referring to FIG. 2, the cartridge frame 10 according to this embodiment is a cartridge frame which is inserted between a plurality of unit battery cells 1 stacked to form a modularized battery, and largely includes an inter-cell separation plate 11 and a sidewall part 12, wherein a cell receiving part 20 configured to receive the unit battery cell 1 may be defined by the inter-cell separation plate 11 and the sidewall part 12.

The inter-cell separation plate 11 is a planar member which is inserted between adjacent unit battery cells 1 to separate the adjacent unit battery cells 1 from each other. The inter-cell separation plate 11 is formed from a material having a mechanical strength to some extent, such as, for example, metal or plastic, and is generally formed from metal having high thermal conductivity, such as, including aluminum, copper, or aluminum or copper alloys, and preferably aluminum or its alloy capable of absorbing heat generated from the battery cells 1 to cool the battery cells 1. Also, according to the need, a coolant channel through which a cooling fluid flows may be formed along the edges of the inter-cell separation plate 11, or a plurality of through-channels arranged across the inter-cell separation plate 11, through which air passes may be formed in the inter-cell separation plate 11 per se. Here, the plurality of through-channels is preferably open to the outside through the sidewall part 12.

The sidewall part 12 is formed to extend in the direction perpendicular to the plate surface of the inter-cell separation plate 11 at the edge of the inter-cell separation plate 11. Here, at least a portion of the sidewall part 12 has a double wall structure made of different materials. Specifically, as shown in (b) of FIG. 2, an inner sidewall 12a of the sidewall part 12 coming in contact with the side surface of the unit battery cell 1 is formed from metal, and an outer sidewall 12b facing the inner sidewall 12a is formed from a material commonly used to make the cartridge frame, such as, for example, plastic. Considering convenience in the manufacturing process or its functions described below, the metal used to form the inner sidewall 12a is preferably metal having high thermal conductivity, such as, for example, aluminum, copper, or aluminum or copper alloys, as the metal used to make the inter-cell separation plate 11 described above. In this instance, the metal for the inner sidewall 12a of the sidewall part 12 and the metal for the inter-cell separation plate 11 may be identical or different.

As the inner sidewall 12a coming into contact with the side surface of the unit battery cell 1 is formed from metal, in case a plurality of unit battery cells 1 is stacked to form a battery module (see 100 in FIG. 5), albeit any one unit battery cell 1 subject to a fire or combustion, the inner sidewall 12a made from metal absorbs heat or blocks flames and radiates the heat, thereby preventing the sidewall part 12 of the cartridge frame 10 from easily melting or combusting.

Where a pouch-type battery is used as the unit battery cell 1, the fusion sealing part 1b of a laminate sheet (see 1b in FIG. 1) formed on the side surface of the battery cell 1 is structurally the most weak and is thus susceptible to burst. However, the inner sidewall 12a of the sidewall part 12 of the cartridge frame 10 may come into direct contact with high temperature gas or flames, and thus the present disclosure is useful especially in this case.

Figure 3:
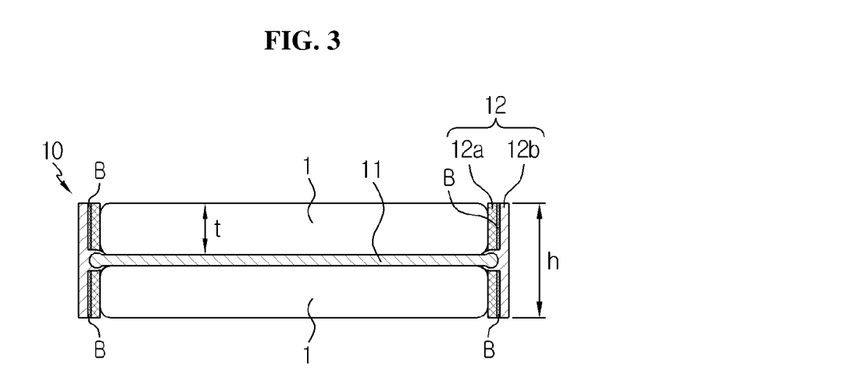
FIG. 3 is a schematic cross-sectional view showing a structure of a cartridge frame according to another embodiment of the present disclosure.

According to another aspect of the present disclosure, to prevent the sidewall part 12 from melting or combusting more effectively, a flame barrier layer B may be optionally interposed between the inner sidewall 12a and the outer sidewall 12b forming the sidewall part 12 as shown in FIG. 3.

The flame barrier layer B may be formed from resin having superior flame retardancy and heat resistance. A non-limiting example of the resin includes a thermoplastic resin composition including a phosphorous-based acrylic copolymer as disclosed in WO2012/015128A1.

The resin composition is proper as a candidate material of the flame barrier layer B due to having high transparency and resistance to scratches, flame retardancy and heat resistance, good mechanical physical properties and flexibility. The flame barrier layer B may be coated on the metal plate constituting the inner sidewall 12a to a predetermined thickness, and may be inserted as an independent sheet medium between the inner sidewall 12a and the outer sidewall 12b and adhered to the inner sidewall 12a and the outer sidewall 12b.

In addition to the thermoplastic resin composition above, it is obvious to those skilled in the art that the flame barrier layer B may be formed from other known resin composition which is known as having superior flame retardancy and heat resistance.

Optionally, the flame barrier layer B may further include pores distributed regularly or irregularly by a foaming process. The pores further improve the effects intended by the present disclosure by retarding the heat transfer to the plastic material constituting the outer sidewall 12b.

The flame barrier layer B may be formed from not only the resin composition above but also a ceramic material having superior heat resistance, such as, for example, alumina.

Figure 5:
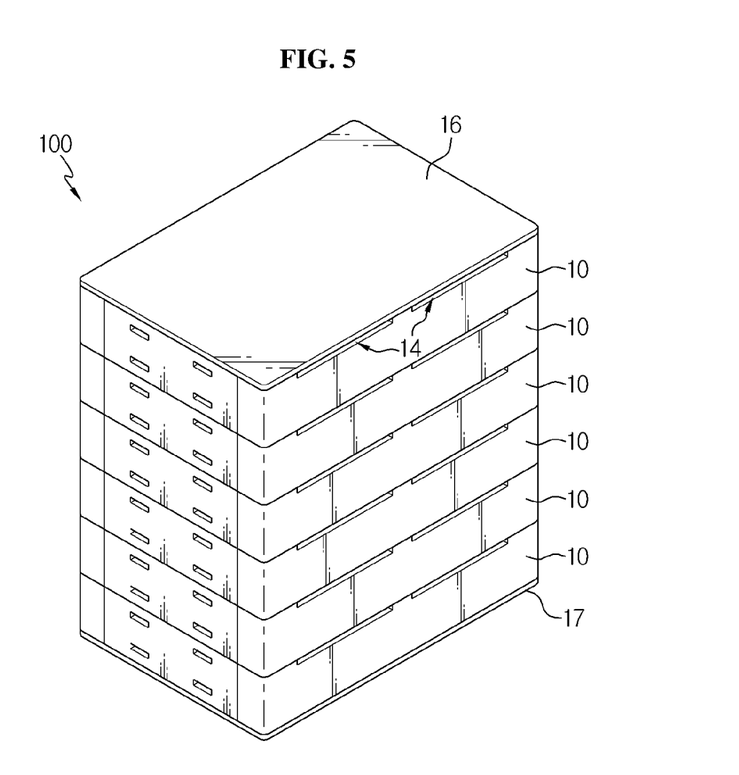
FIG. 5 is a schematic perspective view showing a battery module of an embodiment according to another embodiment of the present disclosure.

On the other hand, a groove 13 formed in the sidewall part 12 on the rear side (as indicated by ② in (a) of FIG. 2) of the cartridge frame is an engaging groove that allows for easy alignment and coupling between cartridge frames 10 when stacking a plurality of unit battery cells 1 to form a battery module by using the cartridge frames 10 (see 100 in FIG. 5). Although not shown in the drawings, an engaging protrusion is formed at the bottom of the sidewall part 12 at a location corresponding to the engaging groove 13 in a corresponding shape that can be inserted into the engaging groove 13.

Also, a groove 14 formed in the sidewall part 12 on the left and right sides (as indicated by ③ and ④ in (a) of FIG. 2) of the cartridge frame is a channel groove for forming a channel which allows flowing of air as a coolant when a plurality of unit battery cells 1 is stacked to form a battery module 100 by using the cartridge frames 10.

However, the engaging groove 13 or the engaging protrusion and the channel groove 14 formed in the sidewall part 12 may be changed in their specific shape or where they are formed.

The cartridge frame 10 according to this embodiment may be integrally formed by insert injection molding. That is, first, a metal plate for the inter-cell separation plate 11 and a metal plate for the inner sidewall 12a of the sidewall part 12 are formed with a desired shape by press processing. Subsequently, these metal plates are installed in a mold for forming the cartridge frame 10, a melted solution of plastic for forming the outer sidewall 12b of the sidewall part 12 is injected into the mold.

As above, when the cartridge frame 10 is made using insert injection molding, a separate process of assembling the metal plates for the inter-cell separation plate 11 and the inner sidewall 12a of the sidewall part 12 with the plastic molded part for the outer sidewall 12b of the sidewall part 12 is eliminated, thereby making a manufacturing process simple.

As a variation example of the present disclosure, when the cartridge frame 10 has a structure that a flame barrier layer B is interposed between the inner sidewall 12a and the outer sidewall 12b as shown in FIG. 3, before installing the metal plate for the inner sidewall 12a in the mold used for insert injection molding, a resin composition for forming the flame barrier layer B may be pre-coated on the surface of the metal plate to a predetermined thickness. Alternatively, after pre-manufacturing a sheet (made of resin or a ceramic material) used to form the flame barrier layer B in a design specification, the sheet may be added or may be adhered to a metal plate for the inner sidewall 12a using an adhesive, and the sheet and the metal plate may be then installed together in the mold. When this process is applied, the flame barrier layer B with a predetermined thickness is formed between the inner sidewall 12a and the outer sidewall 12b.

On the other hand, in the cartridge frame 10 according to this embodiment, the sidewall part 12 is not formed at all the edges of the inter-cell separation plate 11. That is, the sidewall part 12 is not formed at the edge of the inter-cell separation plate 11 disposed on the front side (as indicated by ① in (a) of FIG. 2) of the cartridge frame 10. It is because this part is where the electrode terminal 1a of the unit battery cell 1 (see 1a in FIG. 1) protrudes and an electrode terminal connection part 15 is engaged to electrically connect between electrode terminals 1a of unit battery cells 1 that make up a battery module 100.

That is, the cartridge frame 10 according to this embodiment may further include the electrode terminal connection part 15 which is coupled to the edge of the direction in which the electrode terminal 1a of the unit battery cell 1 is drawn, among the edges of the inter-cell separation plate 11. The electrode terminal connection part 15 has an engaging groove 15b to which a front side edge of the inter-cell separation plate 11 of the cartridge frame 10 is inserted and engaged, and an electrode terminal through-hole 15a through which the electrode terminal 1a of the unit battery cell 1 is introduced and exposed therethrough. Thus, when stacking a plurality of unit battery cells 1 to form a battery module 100, the electrode terminal 1a of the unit battery cell 1 exposed through the electrode terminal through-hole 15a may be connected to an electrode terminal 1a of an adjacent battery cell 1 in series or parallel. However, the electrode terminal connection part 15 shown in FIG. 2 is just an example, and its specific shape and structure may be changed.

On the other hand, in FIG. 2, the height h of the sidewall part 12 is set to be approximately twice greater than the thickness t of one unit battery cell 1, and two unit battery cells 1 are received in one cartridge frame 10, one above and one below, with the inter-cell separation plate 11 interposed therebetween, and as a result, one cartridge frame 10 is inserted every two unit battery cells 1 to make up the battery module 100.

However, the height h of the sidewall part 12 may be variously changed. That is, the height h of the sidewall part 12 may be increased to include a larger number of unit battery cells 1 in between adjacent cartridge frames 10, and on the contrary, the height h of the sidewall part 12 may be reduced to include only one unit battery cell 1 in between adjacent cartridge frames 10 (see (a) of FIG. 4). Further, although the sidewall part 12 extends up and down the same height with respect to the inter-cell separation plate 11 in (b) of FIG. 2 and (a) of FIG. 4, it does not necessarily do so. That is, as shown in (b) of FIG. 4, a sidewall part 12" may have a structure that only extends upwards from the inter-cell separation plate 11. FIG. 5 is a schematic perspective view showing a battery module of an embodiment according to another aspect of the present disclosure, and this embodiment is an example of constructing a battery module 100 using the cartridge frame 10 shown in FIG. 2.

That is, the battery module 100 according to this embodiment is a modularized battery formed by receiving the unit battery cell 1 in the above-described cartridge frame 10 and stacking them one on top of each other. However, illustration of the electrode terminal 1a exposed through the electrode terminal through-hole 15a of the electrode terminal connection part 15 is omitted in FIG. 5. On the other hand, an upper cover 16 and a lower cover 17 are respectively added to the uppermost and lowermost of the battery module 100 to complete the battery module 100.

According to the invention, because the inner sidewall 12a of the sidewall part 12 of the cartridge frame 10 coming into contact with the side surface of the unit battery cell 1 is formed from metal and the outer sidewall 12b is formed from plastic, when a fire or combustion occurs in any one of the plurality of unit battery cells 1 included in the battery module 100, the sidewall part 12 of the cartridge frame 10 is less prone to melt or combustion, thereby preventing the propagation of the fire or combustion to other adjacent unit battery cell 1. Also, this effect may be further improved when the flame barrier layer B is interposed between the inner sidewall 12a and the outer sidewall 12b. The battery module 100 according to this embodiment is useful especially in the case the unit battery cells 1 that make up the battery module are a pouch-type battery cell.

Figure 4:
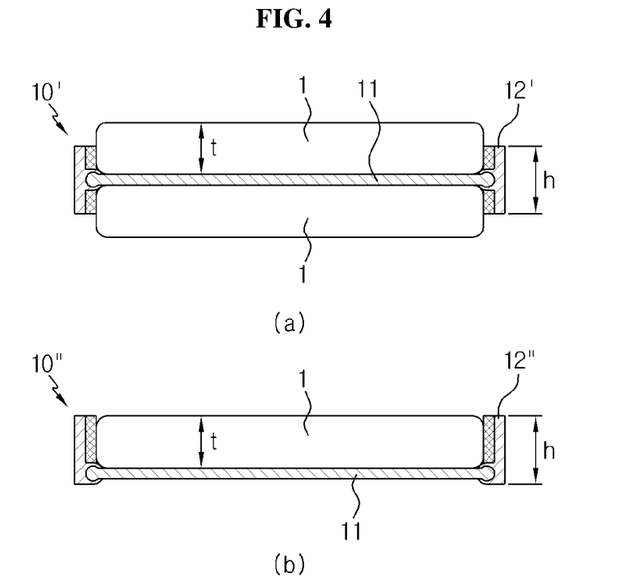
FIG. 4 is a schematic cross-sectional view showing variations of a cartridge frame according to still another embodiment of the present disclosure.

On the other hand, while the plurality of cartridge frames 10 and the plurality of unit battery cells 1 is shown and described as being stacked in the vertical direction in FIG. 5, and the cartridge frame 10 is shown and described as being placed in the vertical stack direction in FIGS. 2 through 4, the present disclosure is not limited based on the stack direction. That is, the plurality of cartridge frames 10 and the plurality of unit battery cells 1 may be stacked in the horizontal. Accordingly, the terms used to indicate the direction in the description above, such as 'upper', 'lower', 'right', 'left', 'front', and 'rear', are relative terms, and may change based on a relative position of a viewer.

Hereinabove, the preferred embodiment of the present disclosure has been shown and described, but the present disclosure is not limited to the particular preferred embodiments described in the foregoing, and it will become apparent to those skilled in the art that various changes and modifications may be made without departing from the essential features of the present disclosure, and such changes and modifications fall within the scope of the claims.

INDUSTRIAL APPLICABILITY

The cartridge frame of the present disclosure may prevent the sidewall part from melting or combusting due to flames occurred at the inner side thereof, and prevent the propagation of the flames to an adjacent area. Therefore, the battery module employing the cartridge frame of the present disclosure may improve the resistance to flames. Particularly, when the flame barrier layer is included in the sidewall part of the cartridge frame, the effects of the present disclosure may be further enhanced. Also, the cartridge frame according to the present disclosure is particularly useful to manufacture a modularized battery by stacking pouch cells easy to ignite or explode.

What is claimed is:

1. A cartridge frame which is inserted between a plurality of unit battery cells stacked, the cartridge frame comprising:
   an inter-cell separation plate with a planar shape inserted between adjacent unit battery cells to separate the adjacent unit battery cells; and
   a sidewall part extending in a direction perpendicular to the planar surface of the inter-cell separation plate at an edge other than an edge of a direction in which an electrode terminal of the battery cell is drawn, among edges of the inter-cell separation plate,
   wherein for at least a portion of the sidewall part, an inner sidewall coming into contact with a side surface of the unit battery cell is made from metal, and an outer sidewall facing the inner sidewall is made from plastic.

2. The cartridge frame according to claim 1, wherein the inter-cell separation plate is formed from metal.

3. The cartridge frame according to claim 1, wherein the metal is aluminum or an aluminum alloy.

4. The cartridge frame according to claim 1, wherein the cartridge frame has the inter-cell separation plate and the sidewall part integrally formed by insert injection molding.

5. The cartridge frame according to claim 1, further comprising:
   an electrode terminal connection part coupled to the edge of the direction in which the electrode terminal of the battery cell is drawn, among the edges of the inter-cell separation plate, wherein the electrode terminal is connected to the electrode terminal connection part.

6. The cartridge frame according to claim 1, wherein the sidewall part protrusively extends to a height corresponding to a thickness of the unit battery cell from the inter-cell separation plate.

7. A battery module comprising:
a plurality of the cartridge frames defined in claim 1,
wherein at least one unit battery cell is inserted between the plurality of cartridge frames and stacked.

8. The cartridge frame according to claim 2, wherein the metal of the inter-cell separation plate is aluminum or an aluminum alloy.

9. The cartridge frame according to claim 2, wherein the cartridge frame has the inter-cell separation plate and the sidewall part integrally formed by insert injection molding.

10. The cartridge frame according to claim 2, further comprising:
an electrode terminal connection part coupled to the edge of the direction in which the electrode terminal of the battery cell is drawn, among the edges of the inter-cell separation plate, wherein the electrode terminal is connected to the electrode terminal connection part.

11. A battery module comprising:
a plurality of the cartridge frames defined in claim 2,
wherein at least one unit battery cell is inserted between the plurality of cartridge frames and stacked.

* * * * *